Oct. 30, 1962 F. P. RE CASINO 3,061,066
COUNTER AND STACKER
Filed Aug. 26, 1958 8 Sheets-Sheet 1

INVENTOR.
FRANK P. Re CASINO
BY
ATTORNEY

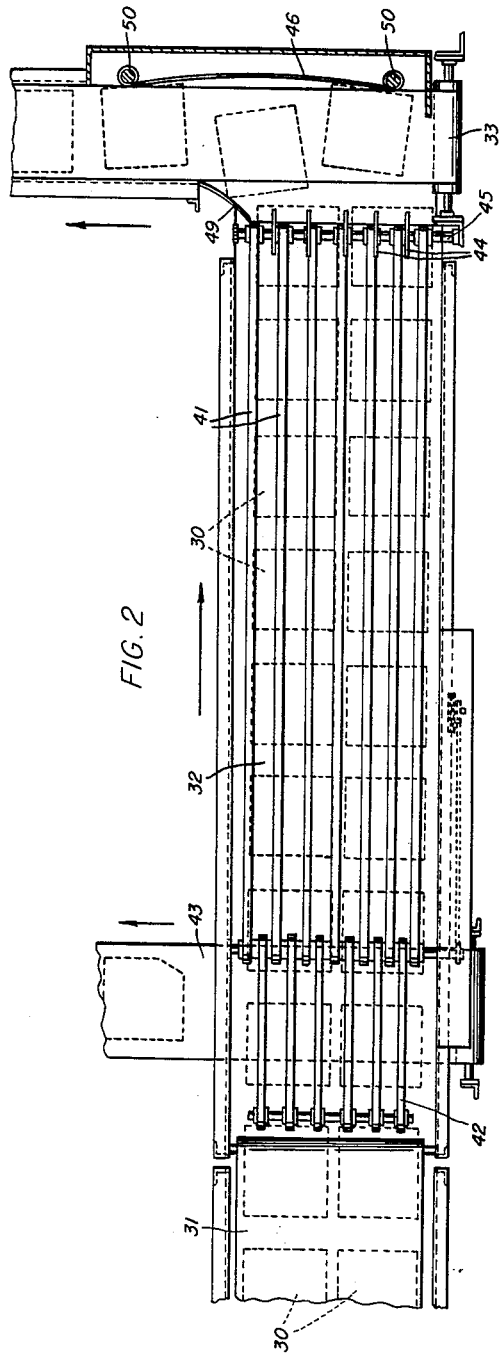
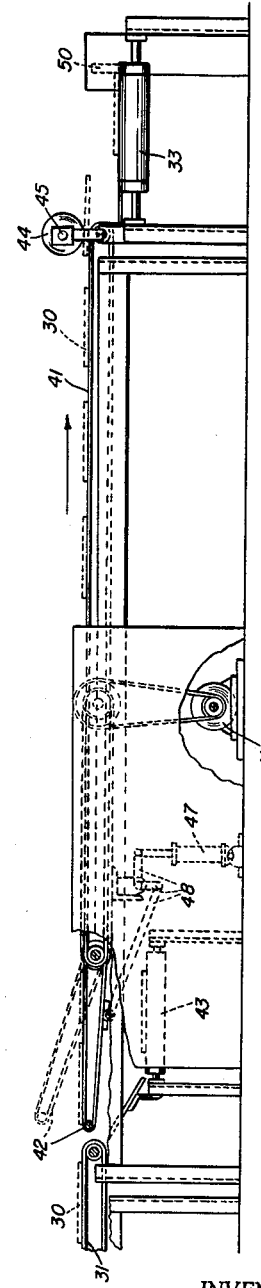
INVENTOR.
FRANK P. Re CASINO

Oct. 30, 1962

F. P. RE CASINO 3,061,066

COUNTER AND STACKER

Filed Aug. 26, 1958

INVENTOR.
FRANK P. Re CASINO

BY
ATTORNEY

Oct. 30, 1962  F. P. RE CASINO  3,061,066
COUNTER AND STACKER
Filed Aug. 26, 1958  8 Sheets-Sheet 4

INVENTOR.
FRANK P. Re CASINO
BY
ATTORNEY

Oct. 30, 1962   F. P. RE CASINO   3,061,066
COUNTER AND STACKER
Filed Aug. 26, 1958   8 Sheets-Sheet 6

INVENTOR.
FRANK P. Re CASINO
BY
ATTORNEY

Oct. 30, 1962 F. P. RE CASINO 3,061,066
COUNTER AND STACKER
Filed Aug. 26, 1958 8 Sheets-Sheet 7

INVENTOR.
FRANK P. Re CASINO
BY
ATTORNEY

Oct. 30, 1962 F. P. RE CASINO 3,061,066
COUNTER AND STACKER
Filed Aug. 26, 1958 8 Sheets-Sheet 8

INVENTOR.
FRANK P. Re CASINO
BY
ATTORNEY

3,061,066
COUNTER AND STACKER

Frank P. Re Casino, Parsippany, N.J., assignor to Congoleum-Nairn Inc., Kearny, N.J., a corporation of New York
Filed Aug. 26, 1958, Ser. No. 757,413
3 Claims. (Cl. 198—30)

This invention relates to an apparatus for counting and stacking individual articles and particularly to effecting automatic aligning, counting and stacking of flat articles such as resilient floor tile.

Resilient tile, such as asphalt tile, vinyl tile, cork tile and rubber tile often leave the inspection station of a production line in a jumbled and overlapping condition. The tiles must then be counted, arranged in a stack and packed into cartons. In some cases the counting is done by measuring the height of a pile of tiles; in other instances the procedure is to stack tile in each carton until it is filled. These operations are time-consuming and their accuracy is subject to human and mechanical error. Often the tiles vary slightly in thickness, resulting in cartons containing too many or too few tiles.

Since tiles are made in different thicknesses and sizes on the same equipment for different service conditions, it is important that any automatic device being used to orient, count or stack tiles be either self-adjusting or adapted to simple changes of settings to handle the full range of sizes and thicknesses.

An object of the invention is to provide a device for automatically converting a flow of overlapping and jumbled flat articles into a flow of single, aligned articles which can be readily counted.

Another object of the invention is to provide such a device which will be adaptable to handle articles of different thicknesses and size.

Another object is to provide a device for orienting a random flow of flat articles into a single straight line flow.

Another object is to provide a limiting device for converting a flow of overlapping articles into a flow of individual articles.

A further object is to allow simultaneous counting of flat articles and removal of a stack of precounted articles from the device.

A still further object of the invention is to provide a device for stacking a designated number of articles in a pile and for removing such a pile from the apparatus.

In accordance with the invention, flat articles of uniform thickness are supplied on a conveyor to the counting and stacking device in a random and overlapping relation. The defective articles are first separated and then the remaining articles converted from a random flow to a single, straight line flow by allowing them to pass onto a conveyor moving at substantially a right angle to the first conveyor. The second conveyor has a width only slightly larger than the width of one article so as to allow the passage of only aligned articles. The articles are then conveyed to a limiting mechanism which allows only one article to pass at a time. In the event that a number of the aligned articles are piled on top of each other, the limiting mechanism will allow the passage of only the bottom article adjacent the conveyor. The articles after passing the limiting mechanism are transferred to a third conveyor which is operated at a slightly greater speed than the second conveyor. This speed differential creates a space or gap between each article so that an actuating device can count the articles.

The articles fall from the third conveyor into a catch basin of a size just sufficient in length and width to accommodate the articles and being of sufficient depth to accommodate the number of articles desired in the stack.

When the desired number of articles have fallen into the catch basin, as indicated by the counting device, a catch plate is placed over the counted pieces to catch and hold the following pieces while still allowing each succeeding article to be counted and stacked on top of the preceding articles. The counted pieces are then removed from the catch basin and then the catch plate retracted thereby allowing the counted articles being held by the catch plate to fall into the catch basin. When the next desired quantity of articles has been reached, the cycle is repeated. The stack of counted flat articles removed from the catch basin can then be placed in cartons or treated in any desired fashion.

A feature of the apparatus is the utilization of a pivoting conveyor to remove defective articles to prevent their entrance into the counting and stacking mechanism.

Another feature of the apparatus is the use of a flexible pressure arm to prevent the articles from falling in any but a flatwise manner.

Another feature of the apparatus is the utilization of a self-compensating, flexible wall in the end of the second conveyor to help align the articles and prevent any articles from becoming jammed.

Another feature of the apparatus is the use of two tandem rolls or wheels to limit the number of articles allowed to pass a given point on a conveyor.

Another feature of the apparatus is the utilization of a pressure arm to cause the articles to fall consistently at the same angle and to contact the same point in the catch basin to facilitate proper timing of the machine.

A further feature is the provision of a catch plate to interrupt and collect the continuous flow of articles when the designated number of articles have been stacked in a catch basin to allow the removal of the stack.

These and other features of the invention and the advantages thereof will be better understood from the following detailed description when it is read in conjunction with the several figures of the drawings in which:

FIG. 2 is a plan view of the feed conveyor.

FIG. 3 is an elevational view of the feed conveyor showing the gate for rejecting articles and the mechanism for operating the conveyor and gate.

Figure 1:
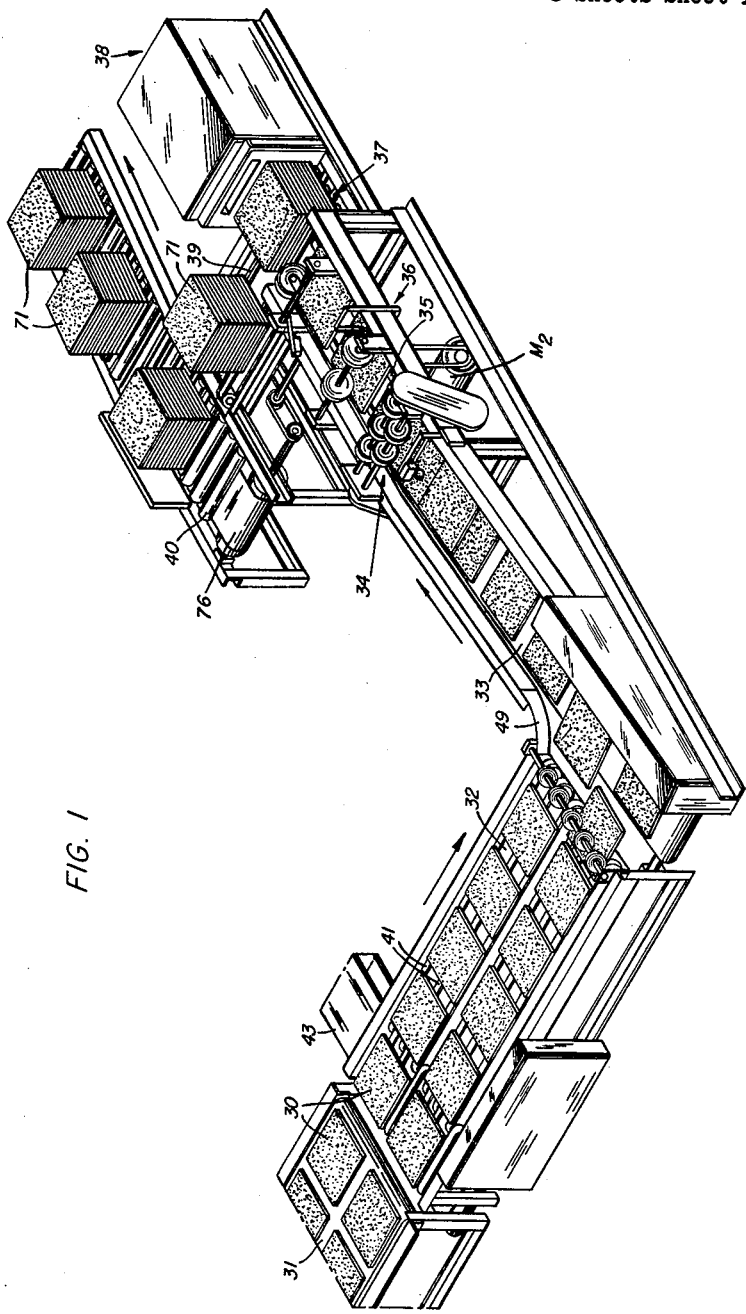
FIG. 1 is a view in isometric view of one embodiment of the counter and stacker.

Referring to FIG. 1, flat articles 30 which are illustrated as conventional tile having dimensions 9 inches by 9 inches and of substantially uniform thickness are fed from a production line generally indicated at 31 onto a conveyor 32. The tiles are passed from the conveyor 32 to a second conveyor 33 which is at approximately a right angle to the first conveyor 32 and somewhat lower in elevation. The tiles in this manner are aligned into a single channel of flow. The tiles are carried by the second conveyor 33 to a limiting device generally indicated at 34 which allows only one tile to pass at a time. The tiles are then passed onto a third conveyor 35 which is traveling faster than the second conveyor 33. This speed differential creates a gap between each tile which allows the counting mechanism generally indicated at 36 to count the number of tiles which pass. The counted tiles are allowed to fall into a catch basin generally indicated at 37 and when the desired number of tiles have been placed in the catch basin 37, a catch plate mechanism generally indicated at 38 interrupts the flow of tiles. The pile of counted tiles is then removed from the catch basin 37 by a discharge conveyor 39 to a storage conveyor 40.

The feed conveyor 32 illustrated is made up of a series of individual V belts 41 and is driven by means of motor $M_1$. As shown more clearly in FIGS. 2 and 3, the conveyor 32 is equipped with a pivoting section 42 which will pivot upwards so that tile coming from the production line can be made to fall onto a scrap conveyor 43 to be carried to a scrap pile or recycled in the manufacturing process. The purpose of this pivoting section 42 is to allow a series of tiles which do not meet inspection standards to be recycled without entering the automatic counter and stacker mechanism. The pivoting section is under the control of an operator who inspects the tile and is operated by means of electric switch 103 which actuates a solenoid 108 which controls air cylinder 47 which moves pivotal arms 48.

The tiles are carried by the conveyor 32 to a point where they are discharged onto the second conveyor 33 which is at approximately a right angle to the first conveyor 32 with a slightly lower elevation. The tiles 30 upon leaving the first conveyor 32 pass under one or more of a series of flexible rubber rolls 44 which serve as pressure arms which press the tile against the conveyor 32. The flexible rubber rolls are mounted on a common shaft 45 which extends transversely across the conveyor 32 at its terminal point. The tiles are cantilevered over the second conveyor 33 by the pressure of the rubber rolls thereby assuring that the tiles fall flatwise onto the second conveyor. This prevents any damage which might occur to the edges of the tiles if they were allowed to fall directly onto the second conveyor, and, in addition, prevents damage to the conveyor belt. In place of the flexible rubber rolls 44, brushes can be used which would have the second function of cleaning off the tile.

The second conveyor 33 has sides 46 and 49 which create a funnel at its lower end. The funnel shape is necessary to align the tiles since all the tiles which fall onto the second conveyor will not be perfectly centered. It is necessary for the funnel to be so constructed that one side wall will create greater friction on the tile than the opposite wall. In order to accomplish this, one of the side walls is resilient. As shown in the FIG. 2, the side of the funnel shaped portion opposite the side of entry of the tile of second conveyor 33 is formed of a resilient member 46. This resilient member will overcome any tendency of the tiles of jam due to turning of the tile at an angle as they are carried by the second conveyor 33 since the wall will flex in accordance with the pressure exerted on it thereby creating less friction on the edge of the tile than is caused by the contact of the opposite edge of the tile against the opposie wall. As shown in FIG. 2 the resilient member 46 is formed of a flexible steel sheet secured at its ends by metal pins 50 set apart and at right angles to the conveyor 33. In place of this, the flexible member can be a fabric belt under tension or the like.

Figure 4:
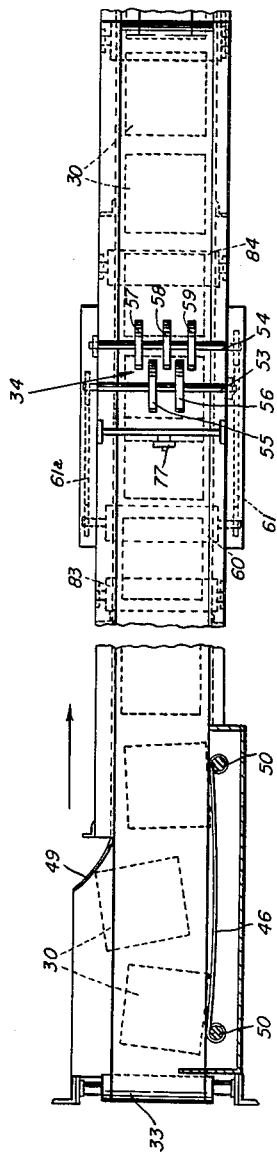
FIG. 4 is a plan view of the second conveyor showing the limiting mechanism.
Figure 5:
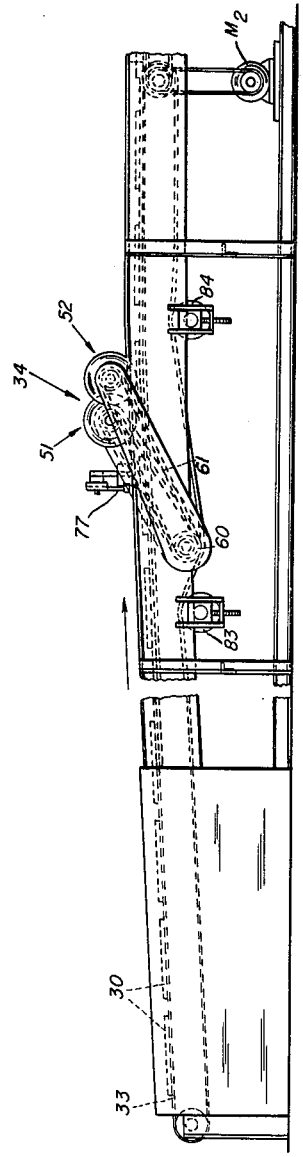
FIG. 5 is an elevational view of the second conveyor showing the limiting mechanism and the drive for operating this mechanism and the conveyor.
Figure 8:
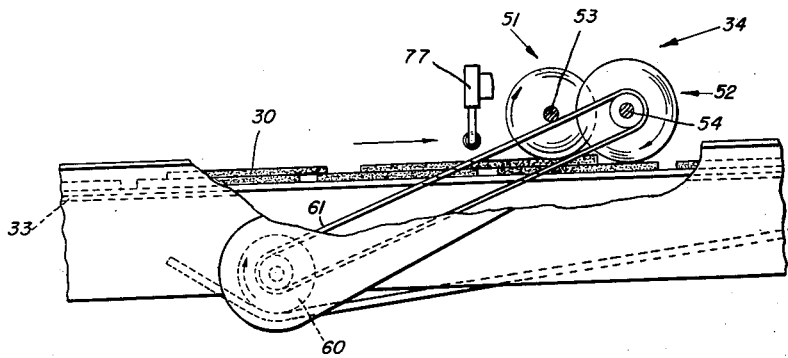
FIG. 8 is an enlarged view showing the limiting mechanism.
Figure 9:
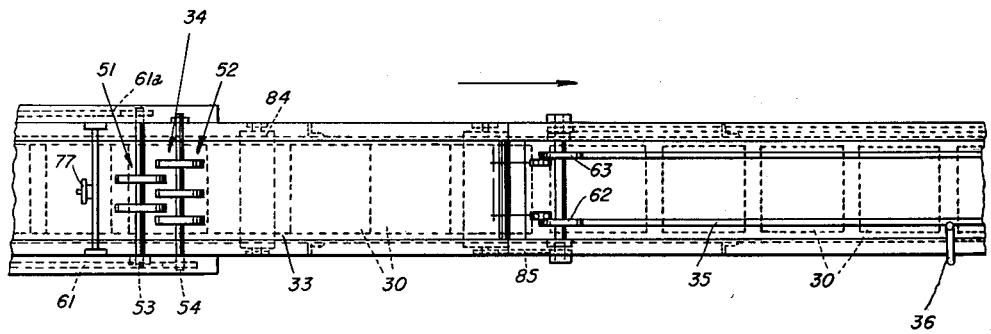
FIG. 9 is a plan view of the second and third conveyors showing the articles being spaced apart.
Figure 10:
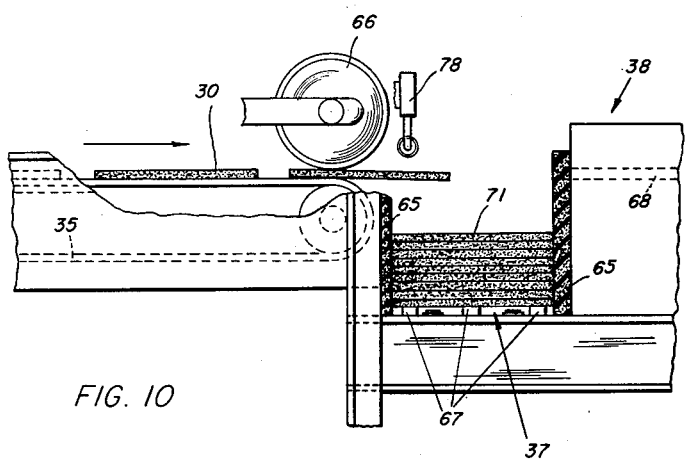
FIG. 10 is an enlarged view of the stacking unit.
Figure 11:
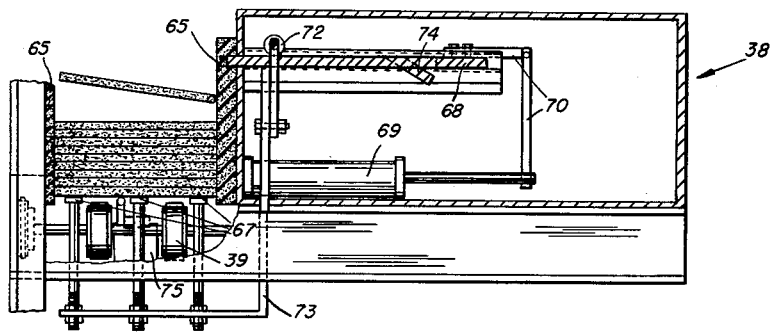
FIG. 11 is an enlarged elevational view partly in section showing the stacker unit and the mechanism for operating it.

The tiles are carried by the inclined second conveyor 33 to a limiting mechanism generally indicated at 34 which prevents the passage of more than one tile at a time by brushing back any tile on top of the pile adjacent the conveyor. As can be seen by reference to FIGS. 4, 5 and 8, the limiting mechanism is formed of two sets 51 and 52 of intermeshing wheels mounted on parallel shafts 53 and 54 which are also parallel to the second conveyor 33. The first set 51 of wheels is located above the second conveyor with just enough clearance to allow the passage of two articles on top of each other. It is preferable that the clearance between the wheel and the conveyor be slightly less than the thickness to be allowed to pass and that the wheels be made of some resilient material with sufficient give to allow passage of the desired thickness. This arrangement will greatly facilitate the apparatus since it will take care of the situation when only the back portion of the first tile is on top of a succeeding tile. The wheel will create sufficient drag on the top tile to cause it to be aligned on top of the succeeding tile. The second set 52 of wheels is located above the conveyor with just enough clearance to allow a single tile between the wheels and the second conveyor 33. In operation, the first set of wheels will brush the tile back so only two tiles can pass and only when the top tile is completely on top of the under tile and the second set of wheels will prevent the passage of the top tile. The sets of intermeshing wheels preferably incorporate five wheels, two 55 and 56 are mounted on the first shaft 53 and three wheels, 57, 58 and 59 are mounted on the second shaft 54. The wheels are constructed of suitable material such as rubber which will prevent damage to the tiles. The wheels are rotated in a direction so that their tangential direction at the bottom of the wheels is opposite that of the second conveyor 33. In this manner, the wheels exert a sweeping back action against any tiles which are on top of the single tile which is allowed to pass between the second conveyor 33 and the wheels. It is not necessary for the sets 51 and 52 to intermesh and they may be set apart. The sets of wheels can be driven off of the second conveyor 33 by means of a contact roll 60 which presses against the conveyor belt by the action of two take up rolls 83 and 84. The roll 60 drives one set of wheels 51 through a suitable pulley arrangement 61 and the other set of wheels through pulley arrangement 61a.

The single aligned tiles are carried by the second conveyor 33 to a third conveyor 35 which is traveling at a slightly faster rate than the second conveyor. The speed of this third faster conveyor is adjusted so that, as the tiles pass to the third conveyor, a space will be created between each tile to facilitate their counting. In order to prevent slippage between the tile and the third conveyor as the tiles are first placed on the third conveyor, pressure rolls 62 and 63 are provided which press the tile against the third conveyor as the tile is passed onto the third conveyor. The third conveyor 35 is driven from the second conveyor 33 by a connecting belt drive 85.

Figure 16:
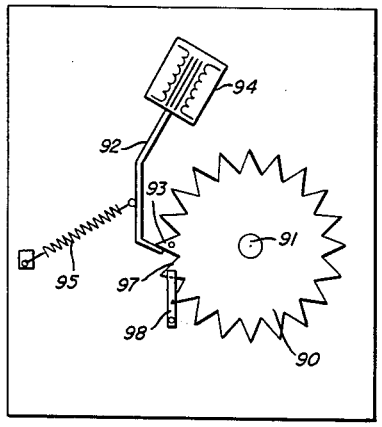
FIG. 16 is a plan view of the counting mechanism.
Figure 17:
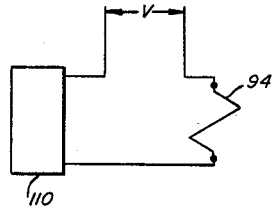
FIG. 17 is a schematic drawing of the electric circuit for the electric eye and counting mechanism.
Figure 18:
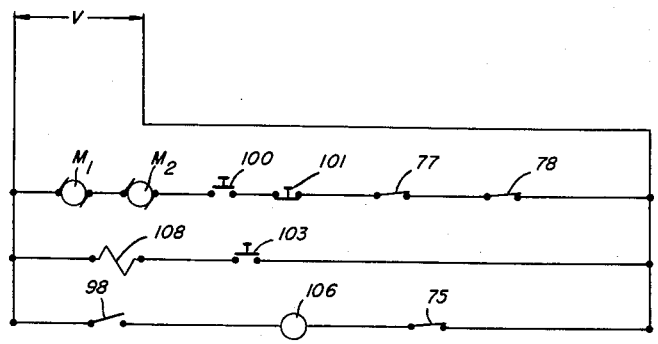
FIG. 18 is a schematic drawing of the electrical circuit for operating the apparatus.

The spaced tiles are counted by any suitable mechanism such as an electric eye 110 and counter generally indicated at 36. The electric counter can be any of the commercially available counters such as a Microflex Counter, manufactured by Eagle Signal Corp., Moline, Illinois. These counters are actuated to move an arm a small distance at each impulse until it hits a contact which actuates a relay to send an electrical impulse to a contact mechanism. Such a counter is illustrated in FIG. 16. A sprocket wheel 90 having teeth which corresponds in number to the number of tiles which are to be counted is secured to a shaft 91 on which it is forced to rotate. A ratchet type member 92 is located adjacent the sprocket wheel so that when it moves upward, it will turn the wheel slightly by pulling on the adjacent tooth 93 of the wheel. The ratchet member is pulled upward by means of a solenoid 94 which is actuated briefly each time the electric eye 110 is caused to feel an impulse by the passage of a tile breaking its beam. The ratchet member 92 is returned to position adjacent the next tooth 97 on the sheet by means of spring 95. When the first tooth 93 has made a complete revolution, it contacts electric contact 98 which causes through a relay 106 air cylinder 69 to operate.

Figure 6:
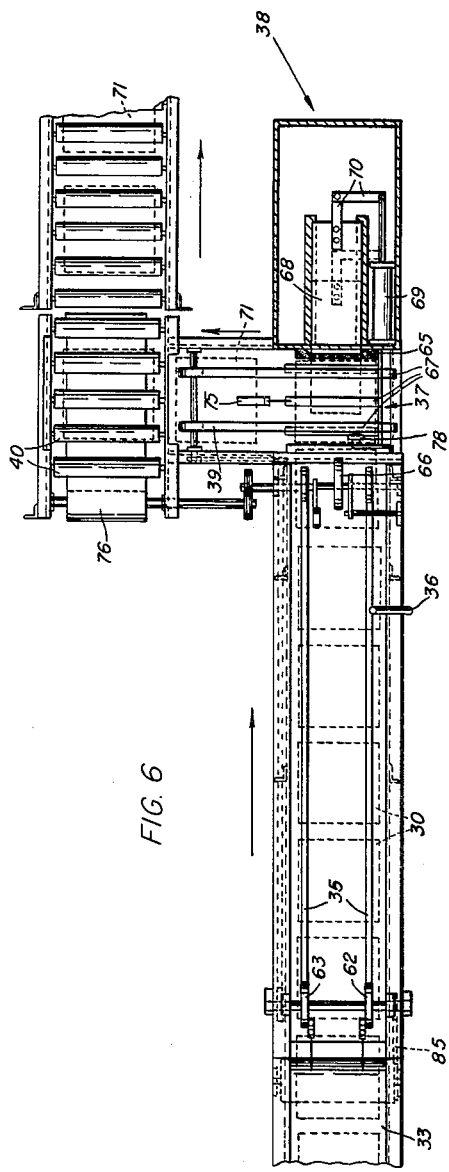
FIG. 6 is a plan view of the third conveyor, the counter and stacker unit and the discharge conveyor.
Figure 7:
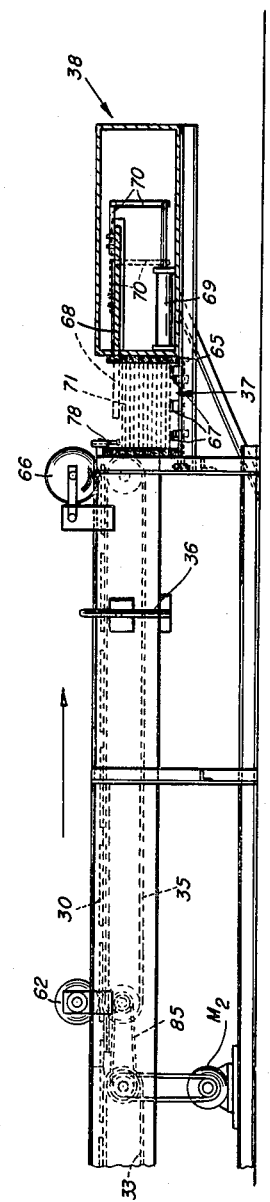
FIG. 7 is an elevational view of the third conveyor, the counter and stacker unit and the drive for operating this conveyor.

The tiles after being counted are carried by the third conveyor to a catch basin 37, as shown in FIGS. 6 and 7 whereby they fall into a uniform pile of a predetermined number of tiles. The tiles on leaving the third conveyor 35 pass under a pressure arm 66 which acts in a manner similar to the flexible rubber rolls 44 between the first and second conveyors to permit the tile to fall flatwise. The tile, however, is allowed to fall into the catch basin on a slight inclined angle to facilitate the action and timing of the catch plate 68. It is necessary for each tile to fall into the catch basin 37 on the same angle and in the same position to permit faultless operation.

Figure 12:
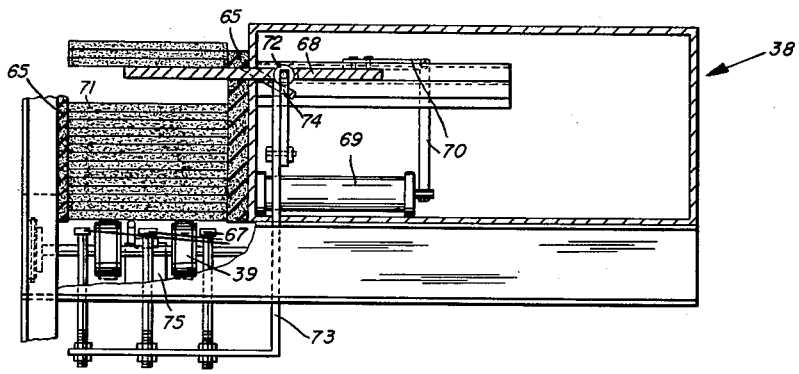
FIG. 12 is an enlarged elevational view partly in section showing the catch plate closed and the apparatus in position to allow the removal of a stack of articles.
Figure 13:
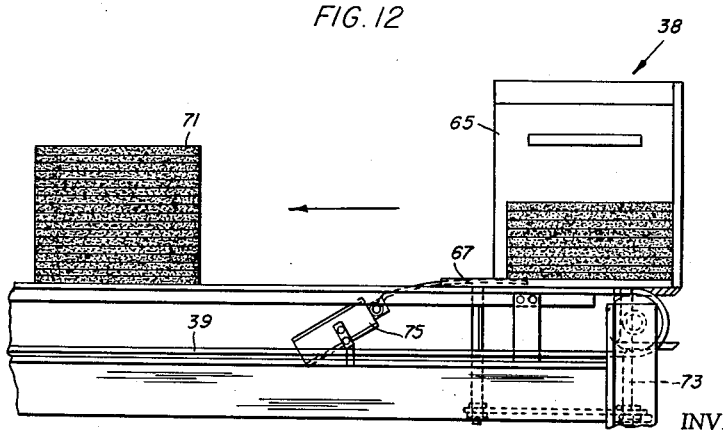
FIG. 13 is an enlarged elevational view showing the articles being stacked in the stacker unit and the switch that resets the catch plate and grids.
Figure 14:
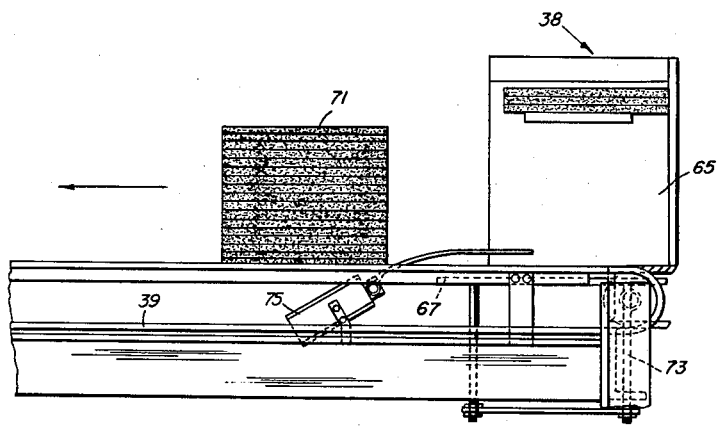
FIG. 14 is an enlarged elevational view showing the counted stack of articles being conveyed out of the stacker unit and the switch that retracts the catch plate and grids.
Figure 15:
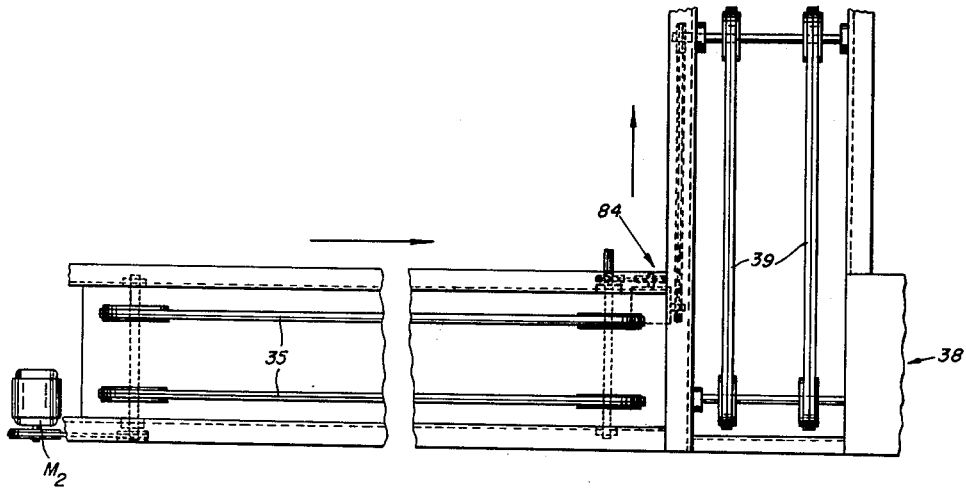
FIG. 15 is a top elevational view of FIG. 14 showing the discharge conveyor.

The stacking unit 37, as shown in FIGS. 6, 7, 10, 11 and 12, comprises a catch basin 37 for receiving the tiles as they fall off the end of the third conveyor 35. The catch basin 37 is equipped with a resilient pad 65 on the opposite side of the catch basin from which the tiles enter to protect the edge of the tiles as their horizontal motion is stopped. The catch basin 37 is equipped with a series of grids 67 on which the pile of tiles rest. When the desired number of tiles have been stacked in the catch basin, as indicated by an electrical pulse from the counting mechanism 36 caused by actuating electric contact 98, a catch plate 68 is caused to move into the path of the tiles falling into the catch basin 37. The catch plate is caused to move by means of an air cylinder 69 which is connected by suitable linkage 70 to the catch plate 68. The following tile, therefore, fall onto the catch plate 68 which is held above the stack of tile. When the catch plate 68 has moved into position as shown in FIG. 12, it causes the grids 67 holding the pile of tile 71 to be lowered which lowers the stack of tile onto a moving conveyor 39, located beneath the grids which carries the pile of tile 71 out of the catch basin. The moving conveyor 39 is driven by means of a right angle gear reducer 84 from the third conveyor 35. The grids 67 are removed by mechanical linkage 73 in cooperation with the catch plate. A roller 72 rides on top of the catch plate 68 and when the catch plate is in position to intercept the succeeding tile, the roller falls into a groove 74 in the surface of the catch plate which causes the linkage 73 to lower, thereby lowering the grids 67. When the pile of tile 71 has been removed from the catch basin, a limit switch 75, as shown in FIGS. 13 and 14, which has been depressed by the weight of the tiles in the catch basin is released which actuates the air cylinder 69 to return the catch plate 68 to its normal position allowing all the tile which had been held on top of the catch plate 68 to fall into the catch basin 37. When the designated number of tiles are in the catch basin, the cycle is repeated. The pile of tiles 71 is carried by the conveyor 39 to any suitable packaging position such as another conveyor 40 driven by belt drive 76 or loaded directly into a carton.

As a safety precaution, limit switch 77 is provided in front of the limiting mechanism 34 so that in case a jam of tile develops and builds up at this point, it will shut off the drive motors $M_1$ and $M_2$. The apparatus can be stopped by off switch 101 or cut-off switches 77 and 78. The pivoting section 42 is raised by switch 103 which actuates solenoid 108 which controls air cylinder 47. The electric eye 110 and counter make up the counting mechanism. As each tile passes the electric eye 110, it caused solenoid 94 to be briefly actuated. When the counter reaches the desired count it closes contact 98 which actuates relay 106, which controls air cylinder 69. Limit switch 75 through relay 106, causes the air to be released from air cylinder 69 thereby returning it to its original position.

Various other modifications of the invention as disclosed above and illustrated in the drawings which are within the spirit and scope of the invention will occur to persons skilled in the art.

What is claimed is:

1. In a device for counting and stacking a predetermined number of flat tiles having a uniform thickness which are fed in a random and overlapping manner to the device comprising in combination a means for orienting and aligning said tiles into a single straight line flow of tiles, a limiting means for converting said straight line flow to a flow of individual tiles, a spacing means for separating said flow of individual tiles to produce a space between each articles, a counting means for counting said spaced tiles, a stacking means for placing a predetermined number of said counted tiles in a pile and a means for removing said pile of counted tiles from said device, the improvement which comprises utilizing as said limiting means two sets of intermeshing rolls mounted on tandem parallel shafts which extend transversely across said straight line flow of tiles, one of said sets of rolls being mounted on one of said shafts and being positioned to allow passage beneath the set of rolls of two tiles at one time only when such two tiles are stacked one upon the other and having their respective surfaces parallel to one another, and the second of said sets of rolls mounted on the other shaft and being positioned downstream from said first roll to allow the passage of only a single tile at one time beneath said second set of rolls, all of said rolls being rotated in a direction opposite to the flow of said articles.

2. A device for limiting the passage of flat articles of substantially uniform thickness fed in an overlapping relationship which comprises a conveyor for carrying said article and two sets of intermeshing rolls mounted on tandem parallel shafts which extend transversely across said conveyor and parallel thereto, one set of said rolls being mounted on said first shaft and positioned above the conveyor to allow a clearance between the bottom of said rolls and said conveyor of a distance approximately equal to the thickness of two articles thereby allowing the passage of two articles between said roll and conveyor only when such articles are stacked one upon the other with their respective surfaces parallel to one another and the second set of rolls mounted on said second shaft being downstream from said first set of rolls and positioned in relation to said conveyor to allow the passage of only a single article between the bottom of said second set of rolls and said conveyor, said rolls being rotated in a direction opposite to the flow of said articles.

3. The device for limiting the passage of flat articles of substantially uniform thickness as defined in claim 2 wherein said intermeshing rolls are constructed of resilient material.

References Cited in the file of this patent

UNITED STATES PATENTS

| | | |
|---|---|---|
| 1,319,190 | Van Houten | Oct. 21, 1919 |
| 1,569,033 | Reichel | Jan. 12, 1926 |
| 1,828,232 | Rowe | Oct. 20, 1931 |

(Other references on following page)

UNITED STATES PATENTS

| | | | |
|---|---|---|---|
| 2,414,059 | Powers | Jan. 7, | 1947 |
| 2,427,223 | Moore | Sept. 9, | 1947 |
| 2,497,149 | Berdis et al. | Feb. 14, | 1950 |
| 2,506,550 | Morrison | May 2, | 1950 |
| 2,578,314 | Muench | Dec. 11, | 1951 |
| 2,636,736 | Snyder | Apr. 28, | 1953 |
| 2,665,633 | Schubert | Jan. 12, | 1954 |
| 2,761,361 | Hornberger et al. | Sept. 4, | 1956 |
| 2,833,426 | Bosken | May 6, | 1958 |

FOREIGN PATENTS

| | | | |
|---|---|---|---|
| 1,039,978 | France | May 20, | 1953 |